United States Patent
Mimouni et al.

(10) Patent No.: US 10,912,316 B2
(45) Date of Patent: Feb. 9, 2021

(54) CAVITATED FERMENTED DAIRY PRODUCT

(71) Applicant: Yoplait France, Paris (FR)

(72) Inventors: Arnaud Mimouni, Lyons (FR); Javier Romero, Lyons (FR); Philippe Demonte, Vienne (FR)

(73) Assignee: Sodima, Boulogne-Billancourt (FR)

( * ) Notice: Subject to any disclaimer, the term of this patent is extended or adjusted under 35 U.S.C. 154(b) by 524 days.

(21) Appl. No.: 15/521,173

(22) PCT Filed: Oct. 21, 2014

(86) PCT No.: PCT/IB2014/002580
§ 371 (c)(1),
(2) Date: Apr. 21, 2017

(87) PCT Pub. No.: WO2016/063101
PCT Pub. Date: Apr. 28, 2016

(65) Prior Publication Data
US 2017/0311635 A1    Nov. 2, 2017

(51) Int. Cl.
*A23L 3/015* (2006.01)
*A23C 9/123* (2006.01)

(52) U.S. Cl.
CPC .............. *A23L 3/015* (2013.01); *A23C 9/123* (2013.01); *A23C 2260/05* (2013.01); *A23V 2002/00* (2013.01)

(58) Field of Classification Search
CPC ..... A23L 3/015; A23C 9/123; A23C 2260/05; A23V 2002/00
USPC ................... 426/34, 564, 580, 583, 656, 657
See application file for complete search history.

(56) References Cited

U.S. PATENT DOCUMENTS

| 6,861,080 B2 | 3/2005 | Kent et al. |
| 9,259,697 B2 | 2/2016 | Ospina Martinez et al. |
| 2009/0252831 A1 * | 10/2009 | Ospina Martinez .............. A23C 9/1223 426/41 |
| 2011/0278153 A1 | 11/2011 | Bates et al. |
| 2015/0320061 A1 | 11/2015 | Warin et al. |

FOREIGN PATENT DOCUMENTS

WO    WO-2014114970 A1 *  7/2014    ............. A23C 9/123

OTHER PUBLICATIONS

Food Online, SPX Introduces the New APV Cavitator, 2011, https://www.foodonline.com/doc/spx-introduces-the-new-apv-cavitator-0001.*
SPX Application Sheet, APV Cavitator Technology in Functionalisation of WPC and other Food Ingredients, 2013.*
Gogate, "*Hydrodynamic Cavitation for Food and Water Processing*", Food Bioprocess Technology, vol. 4, No. 6, Aug. 1, 2011, pp. 996-1011.
Anonymous: "*Company Confidential Company Confidential Controlled Cavitation Technology—A Next Generation Mixing and Heating Technology*", http://www.asuder.org.tr/asudpdfler/mevzuat/idfsunumlari/oestergaard_bent.pdf, (2012).
Desai, N.T. et al., "*Sensory Properties and Drivers of Liking for Greek Yogurts*", Journal of Dairy Science, vol. 96, No. 12, pp. 7454-7466 (2013).
Danone: "*Petit Suisse Mousse*", Database GNPD (2004).
Yoplait: "*White Bio Mousse Yogurt*". Database GNPD (2009).
Danone: "*Fat Free Mousse*", Database GNPD (2006).
Sfakianakis, P., et al., "*Conventional and Innovative Processing of Milk for Yogurt Manufacture; Development of Texture and Flavor: A Review*", Foods, vol. 3, pp. 176-193, (2014).
Oestergaard, B., "*Controlled Cavitation Technology*", IDF World Dairy Summit, Cape Town, (Nov. 4-8, 2012).

* cited by examiner

*Primary Examiner* — Leslie A Wong
(74) *Attorney, Agent, or Firm* — Diederiks & Whitelaw, PLC; Annette M. Frawley, Esq.

(57) ABSTRACT

Cavitated fermented dairy products and methods of forming these cavitated fermented dairy products are disclosed.

13 Claims, 1 Drawing Sheet

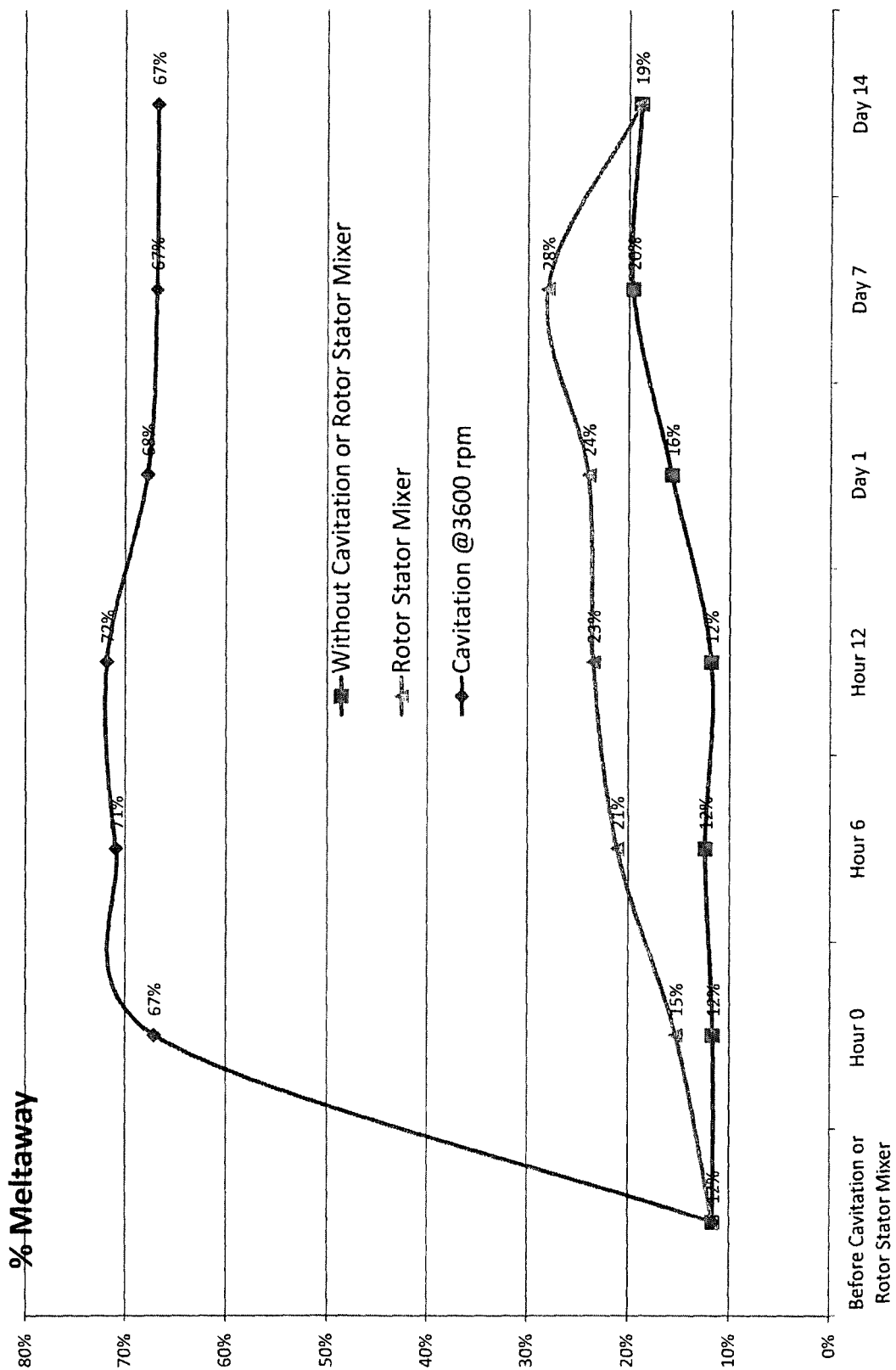

CAVITATED FERMENTED DAIRY PRODUCT

CROSS-REFERENCE TO RELATED APPLICATIONS

This application represents a National Stage application of PCT/IB2014/002580, filed Oct. 21, 2014, and titled "Cavitated Fermented Dairy Product", the entire contents of which is incorporated herein by reference.

BACKGROUND

Lactic acid bacteria is used for production of fermented foods, and they contribute to the flavor, texture and overall characteristics of these products. A well-known example of a fermented dairy product is yogurt. Yogurt is produced from milk that has been inoculated with a culture and fermented.

Strained fermented dairy products are known under the name of the Greek style yogurt or "thick" yogurt. These products have a high protein content (e.g., around 10% wt) which contributes to a very thick texture. Often these products have a low or no fat content. Reducing the fat content in these yogurts results in unsatisfactory taste, characterized by high astringency due to the high content of protein. High protein content plus the low or no fat content, can result in little creaminess despite their high texture. There is a need for fermented dairy products that combine low fat content, high protein content, good mouth feel, good creaminess, low astringency.

SUMMARY

The present disclosure relates to cavitated fermented dairy products that have a high protein and low fat content as well as a high slipperiness and reduced astringency. It has been found that such a cavitated fermented dairy product has an improved mouth feel. In particular the present disclosure relates to cavitated high protein, low fat Greek yogurt dairy products that have an improved % Meltaway. % Meltaway have been discovered to correlate to slipperiness and astringency of dairy products. Increased slipperiness and reduced astringency contribute to higher creaminess of dairy products. Creaminess is one of the main drivers for consumer preference of dairy products.

In one aspect, a method includes passing a fermented dairy material through a cavitation unit operation to form a cavitated dairy product having a protein content of at least 5% wt.

In another aspect, a cavitated dairy product is formed according to this disclosure and the cavitated dairy product has a % Meltaway of at least 50% or at least 60% or at least 70%.

In a further aspect, a cavitated dairy product includes a protein content of at least 5% wt, a solids content of at least 10% wt, and a % Meltaway of at least 50%.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which:

FIG. 1 is a graph of % Meltaway of the samples of the Example.

DETAILED DESCRIPTION

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

In this disclosure:

"Dairy material" refers to milk, milk derivate or mixtures thereof. The milk is selected from raw milk, skimmed milk, semi-skimmed milk, fat-enriched milk, and mixtures thereof. The milk derivate is selected from milk powder, skimmed milk powder, milk proteins, milk protein concentrate, concentrated milk, milk cream and mixtures thereof. The dairy material to be used in the methods described herein and can derive from any milk such as cow's milk, sheep's milk, goat's milk, soy milk, coconut milk, almond milk.

"Slipperiness" refers to the capacity of a dairy product to melt in mouth. The ease the fermented dairy product slips around on the tongue during compression. This property is measured by sensory panel experts placing the defined sample on tongue and compressing once against the palate with tongue.

"Astringency" or chalky film mouthcoating refers to the amount of chalky film left on the interior surfaces of the mouth following expectoration. This property is measured by sensory panel experts chewing the fermented dairy product until ready to swallow or expectorate.

"% Meltaway" refers to rheological properties of the dairy product. Meltaway corresponds to the difference of viscosity between the initial strained fermented dairy product and the end viscosity after a long deformation period. The meltaway is correlated to the thixotropy of the dairy product. "% Meltaway" is calculated using the following equation: % Meltaway=1−((viscosity at 60 l/sec after 60 sec)/(initial viscosity at 60 l/sec). The equipment utilized for the viscosity measurement is a MCR 101 Rheometer (Anton Paar, Graz, Austria). A coaxial cylinder geometry at a constant shear rate of 60 l/sec during 60 seconds at a temperature of 10 degrees centigrade. Viscosity is evaluated at a shear of 60 l/sec as this is the parameter that better describes shear in mouth.

The present disclosure relates to cavitated fermented dairy products and methods of forming these cavitated fermented dairy products. The present disclosure relates to cavitated fermented dairy products that have a high protein and low fat content and a high slipperiness and reduced astringency, hence, improved mouth feel. In particular the present disclosure relates to cavitated high protein, low fat Greek yogurt dairy products that have an improved "meltaway" or % Meltaway. Controlled cavitation of the dairy product provides unique textural properties as compared to standard smoothing processes. The cavitated dairy product builds firmness over time and displays unique thixotropic behavior. For example, the cavitated dairy product has an improved "meltaway" perception (a larger % Meltaway value) in the mouth of a consumer and is much higher than non-cavitated or just smoothed dairy products. Increasing the % Meltaway has been shown to increase "creaminess" by decreasing astringency/chalkiness and increasing slipperiness of a fermented dairy product, particularly a high protein fermented dairy product. While the present disclosure is not so limited, an appreciation of various aspects of the disclosure will be gained through a discussion of the examples provided below.

In many embodiments, dairy materials can be fermented with yogurt bacteria, *Streptococcus thermophiles* and *Lactobacillus delbrueckii* subsp. *bulgaricus*. Optionally, this fermentation step also includes the addition of other lactic acid bacteria, such as *Bifidobacterium* and/or *Lactobacillus acidophilus* and/or *Lactobacillus casei* and/or *Lactobacillus rhamnosus* and/or *Lactobacillus reuteri* and/or *Lactobacillus johnsonii* and/or *Lactobacillus plantarum* and/or *Lactobacillus helveticus* and/or *Lactobacillus fermentum* and/or *Lactobacillus amylovorus* and/or *Lactoccocus lactis* and/or *Leuconostoc mesenteroides*. After inoculation of the dairy material, fermentation can be conducted under the usual conditions suitable for growth of the inoculated bacteria. The fermentation can be stopped when the fermentation medium reaches the desired target pH, in particular from 4 to 4.8, preferably 4.6.

High protein, low fat fermented dairy products (such as yogurt or Greek yogurt) are inherently non-creamy. Increasing the amount of fat in a dairy product correlates to increased creaminess. It is desirable to increase the creaminess of a high protein, low fat fermented dairy products (such as yogurt or Greek yogurt) without adding calories or fat.

High protein fermented dairy products are smoothed after concentration. Smoothing is applied in order to reduce roughness (the amount of irregularity, grains, blisters or bumps which can be seen on the surface of the product) and to increase shininess of product. WO 2014/114970 utilizes a high shear "smoothing" operation to obtain a strained fermented dairy products that claims to have improved texture and organoleptic properties. This smoothing operation is performed with a rotor stator mixer applying a high shear to the dairy product. The rotor stator mixer has product go through cogged rings, a part being static, the remaining part being in rotation at a set speed. This system of cogged rings partly static or in rotation applies a defined shearing to the product by rotating at a velocity between 2-13 m/sec. Examples of a high shear rotor stator mixer are commercially available under the trade designations "X-Series Inline Ultra Shear Mixer" from Charles Ross & Sons Company (Hauppauge, N.Y., USA) or "Dynashear In-Line Dual Stage High Shear Mixer" from Admix, Inc. (Manchester, N.Y.). However, as described in the Example below, this smoothing operation utilizing a high shear rotor stator mixer cannot generate cavitation phenomena on the dairy product, and hence, did not provide the results obtained from the disclosed unique cavitation operation.

Passing a fermented dairy material through a cavitation unit operation surprisingly forms an enhanced creaminess dairy product. The controlled cavitation process surprisingly changes the rheological properties of the fermented dairy product (such as yogurt or Greek yogurt). This surprising change increases the % Meltaway. % Meltaway is proven to correlate to slipperiness and astringency of dairy products. The controlled cavitation operation has been then shown to increase "creaminess" by decreasing astringency/chalkiness and increasing slipperiness of a fermented dairy product, particularly a high protein fermented dairy product. In particular these organoleptic properties of the fermented dairy product are enhanced or significantly increased as compared to smoothed or non-smoothed product. This is illustrated in the Example below.

The cavitation unit operation generates controlled hydrodynamic cavitation within the fermented dairy material to form the cavitated dairy product. In one embodiment, the cavitation unit operation comprises a rotor within a housing. The rotor has a plurality of cavities that generate hydrodynamic cavitation within the fermented dairy material when the rotor spins within the housing. The spinning action generates controlled hydrodynamic cavitation within the cavities. Microscopic cavitation bubbles are produced and as they collapse, shockwaves are given off into the fermented dairy material and alters the structure and rheological properties of the fermented dairy material. This example of a cavitation unit operation is commercially available under the trade designation APV CAVITTOR from SPX Flow Technology (Silkeborg, Denmark).

In many embodiments the fermented dairy material is a yogurt or Greek yogurt. This fermented dairy material can be formed by any known method. For example, skim milk can be combined with skim milk powder to standardize the protein content to 3-4% wt and a total solids content of 9-11% wt. This dairy material mix can then be heat treated at >90 degrees centigrade for >5 minutes and preceded by a high pressure homogenization step at 50 to 250 bars. This homogenized dairy material mix can then be fermented at a temperature from 30-45 degrees centigrade which acidified and forms a dilute fermented dairy material. This dilute fermented dairy material can then be concentrated by separating the water or whey (straining or centrifuging) from the solids to form a fermented dairy material or yogurt having a protein content of at least 5% wt and a total solids content of at least 10% wt. The separation step can occur at a temperature from 30-45 degrees centigrade. Then this fermented dairy material or yogurt can be passed through the cavitation unit operation (preferably continuously unit operation) to form the cavitated diary product.

In many embodiments, the cavitated diary product has a protein content of at least 5% wt, a solids content of at least 10% wt, and a % Meltaway of at least 50%. The cavitated dairy product preferably has a fat content of less than 5% wt or less than 3% wt or less than 2% wt or less than 1% wt. The cavitated dairy product preferably has a protein content in a range from 6 to 15% wt, or from 7 to 12% wt and a solids content in a range from 10 to 20% wt. The cavitated dairy product preferably has a % Meltaway of at least 50%, or at least 60% or at least 70%. In many embodiments the cavitated dairy product is yogurt or Greek yogurt.

Objects and advantages of this disclosure are further illustrated by the following examples, but the particular materials and amounts thereof recited in these examples, as well as other conditions and details, should not be construed to unduly limit this disclosure.

Example

Strained yogurt was formed from skim milk standardized with skim milk powder to produce a diary material having a protein content from 3-4% wt and a total solids content of 9-11% wt. This dairy material was heat treated at >90 degrees centigrade for >5 minutes and high pressure homogenized at 50 to 250 bars. This homogenized dairy material mix was then fermented at a temperature from 30-45 degrees centigrade to form a dilute fermented dairy material. This dilute fermented dairy material was concentrated by separating the water or whey (centrifuging) from the solids to form a yogurt having a protein content of 9-10% wt and a total solids content from 14-16% wt. The separation step occurs at a temperature from 30-45 degrees centigrade. This yogurt material is then cooled down to 5 degrees centigrade.

Control Sample—

A control sample of this yogurt material is then subjected to % Meltaway testing. The equipment utilized for the % Meltway testing was a MCR 101 Rheometer (Anton Paar, Graz, Austria). A coaxial cylinder geometry at a constant shear rate of 60 $s^{-1}$ during 60 seconds at a temperature of 10 degrees centigrade. % Meltaway value is determined with the following formula: % Meltaway=1−((viscosity after 60 sec)/(initial viscosity)).

High Sheer Rotor Stator Mixer Sample—

A sample that was smoothed utilizing a rotor stator mixer operating at 100 Hz and having a rotor peripheral velocity of 19 m/s and a product flow rate of 1100 L/hr. The rotor radial slots were 1.5 mm and stator radial slots were 1.0 mm.

Cavitation Sample—

A sample that was passed through a cavitation unit operation (12 inch APV Cavitator, SPX Flow Technology) operated at 3600 rpm at a product flow rate of 1100 L/hr.

These three samples were tested for % Meltaway before smoothing or cavitation, at Hour 0, Hour 6, Hour 12, and Day 7. These results are graphed at FIG. 1. This FIGURE illustrates the surprising results obtained by passing the fermented dairy product through a cavitation unit operation as compared to a traditional smoothing unit operation.

Thus, embodiments of CAVITATED FERMENTED DAIRY PRODUCT are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A method comprising:
    passing a fermented dairy material through a cavitation unit operation to form a cavitated dairy product having a protein content of at least 5% wt and a % Meltaway of at least 50%, wherein the cavitation unit operation produces microscopic cavitation bubbles that collapse and give off shockwaves into the fermented dairy material.

2. The method according to claim 1, wherein the cavitation unit generates controlled hydrodynamic cavitation within the fermented dairy material to from the cavitated dairy product.

3. The method according to claim 1, wherein the cavitation unit operation comprises a rotor within a housing, the rotor having a plurality of cavities that generate hydrodynamic cavitation within the fermented dairy material when the rotor spins within the housing.

4. The method according to claim 1, further comprising:
    separating liquid from a dilute fermented dairy material to form the fermented dairy material having a protein content of at least 5% wt and a solids content of at least 10% wt;
    fermenting a dairy material to form the dilute fermented dairy material.

5. The method according to claim 1, wherein the cavitation unit operation is a continuous unit operation.

6. The method according to claim 4, wherein the dairy material comprises skim milk having a protein content in a range from 3 to 4% wt.

7. The method according to claim 1, wherein the cavitated dairy product is yogurt.

8. A cavitated dairy product formed according to claim 1, wherein the cavitated dairy product has a fat content of less than 5% wt.

9. A cavitated dairy product formed according to claim 1, wherein the cavitated dairy product has a protein content in a range from 6 to 15% wt.

10. A cavitated dairy product comprising:
    a protein content of at least 5% wt;
    a solids content of at least 10% wt; and
    a % Meltaway of at least 50%.

11. The cavitated dairy product according to claim 10, wherein the cavitated dairy product has a fat content of less than 5% wt.

12. The cavitated dairy product according to claim 10, wherein the cavitated dairy product has a protein content in a range from 6 to 15% wt.

13. The cavitated dairy product according to claim 10, wherein the cavitated dairy product is yogurt.

* * * * *